US009967421B1

United States Patent
Yang

(10) Patent No.: US 9,967,421 B1
(45) Date of Patent: May 8, 2018

(54) IMAGE SCANNING SYSTEM

(71) Applicant: Microtek International Inc., Hsinchu (TW)

(72) Inventor: Jin-Chun Yang, Hsinchu (TW)

(73) Assignee: MICROTEK INTERNATIONAL INC., Hsinchu (TW)

( * ) Notice: Subject to any disclaimer, the term of this patent is extended or adjusted under 35 U.S.C. 154(b) by 0 days. days.

(21) Appl. No.: 15/415,003

(22) Filed: Jan. 25, 2017

(51) Int. Cl.
| | |
|---|---|
| *H04N 1/04* | (2006.01) |
| *H04N 1/10* | (2006.01) |
| *H04N 1/193* | (2006.01) |
| *H04N 1/195* | (2006.01) |
| *H04N 1/031* | (2006.01) |
| *H04N 1/00* | (2006.01) |

(52) U.S. Cl.
CPC ....... *H04N 1/1061* (2013.01); *H04N 1/00827* (2013.01); *H04N 1/031* (2013.01); *H04N 1/193* (2013.01); *H04N 1/19578* (2013.01); *H04N 2201/0081* (2013.01)

(58) Field of Classification Search
CPC .. H04N 1/1061; H04N 1/193; H04N 1/19578; H04N 1/031; H04N 1/00827
USPC .................................................. 358/486, 474
See application file for complete search history.

(56) References Cited

U.S. PATENT DOCUMENTS

| | | | | |
|---|---|---|---|---|
| 6,459,510 | B1* | 10/2002 | Brewer | .................... H04N 1/10 358/474 |
| 7,843,611 | B2* | 11/2010 | Albahri | .................. H04N 1/195 348/207.99 |
| 8,274,712 | B2* | 9/2012 | Sheng | ................ H04N 1/02865 358/474 |

\* cited by examiner

*Primary Examiner* — Houshang Safaipour
(74) *Attorney, Agent, or Firm* — Muncy, Geissler, Olds & Lowe, P.C.

(57) ABSTRACT

An image scanning system of the present invention uses an image capturing unit moving unidirectionally along an optical axis direction, such that an object is positioned within a range of the depth of field of the image capturing unit. The optical axis direction is perpendicular to a plane, and a platform bearing the object and the plane form an included angle, such that multiple inclined surfaces of the object face the same end of a scanning direction, or such that one of the multiple inclined surfaces is parallel to the plane and other inclined surfaces face the same end of the scanning direction, wherein the scanning direction is parallel to the plane. Therefore, in the process of one-time scan, the scanning height of the image capturing unit only rises unidirectionally or descends unidirectionally and has no turning point, and thus, no backlash problem will happen.

9 Claims, 5 Drawing Sheets

IMAGE SCANNING SYSTEM

BACKGROUND OF THE INVENTION

1. Field of the Invention

The present invention relates to an image scanning system, and more particularly to an image scanning system having an inclined platform.

2. Description of the Prior Art

Referring to FIG. 1, in the prior-art scanning system, an object A having irregular surfaces is placed on a platform 30, so that an image capturing unit 10 captures an image of the object A along an optical axis direction Z, wherein the optical axis direction Z is perpendicular to a plane P, and the platform 30 is parallel to the plane P. For example, the object A has a first inclined surface A1 and a second inclined surface A2 and is placed on the platform 30. The first inclined surface A1 faces a first end X1 of a scanning direction X and the second inclined surface A2 faces a second end X2 of the scanning direction X, that is, a normal direction N1 of the first inclined surface A1 is inclined toward the first end X1 and a normal direction N2 of the second inclined surface A2 is inclined toward the second end X2 which is opposed to the first end X1 on the scanning direction X. An included angle between the first inclined surface A1 and the platform 30 is C1, and an included angle between the second inclined surface A2 and the platform 30 is C2. It can be understood that the traditional image scanning system scans the optical image of the object A through the image capturing unit 10 and an optical element 11. If a scanning position of the object A falls outside a range of the depth of field D, the image capturing unit 10 is unable to focus to form a clear image because the image capturing unit 10 has a specific range of depth of field D. Therefore, the image scanning system needs a first driving unit 20 equipped to drive the image capturing unit 10 to move along the optical axis direction Z, so that the object A is kept within the range of depth of field D of the image capturing unit 10.

Referring to FIG. 1 and FIG. 2 together, for example, when the image capturing unit 10 scans from left to right along the scanning direction X and moves from a scanning position XA to a scanning position XB, the first driving unit 20 drives the image capturing unit 10 to move upward along the optical axis direction Z, and the image capturing unit 10 moves from a scanning height ZA to a scanning height ZB. Then, when the image capturing unit 10 continues to scan toward the right along the scanning direction X and moves from the scanning position XB to a scanning position XC, the first driving unit 20 keeps the image capturing unit 10 still and the image capturing unit 10 stays at the scanning height ZB. Finally, when the image capturing unit 10 continues to scan toward the right along the scanning direction X and moves from the scanning position XC to a scanning position XD, the first driving unit 20 drives the image capturing unit 10 to reverse the moving direction and return to move downward along the optical axis direction Z, so that the image capturing unit 10 moves from the scanning height ZB to the scanning height ZA.

Therefore, in the process of the one-time scan, the scanning height of the image capturing unit 10 inevitably rises first and then descends and has a turning point, and as a result, a "backlash" problem is produced. For example, the image scanning system uses a stepper motor 40, connected to the image capturing unit 10 through a gear drive component (not shown), to drive the image capturing unit 10. That is, in the above-mentioned scanning process that the scanning height of the image capturing unit 10 rises first and then descends, the image capturing unit 10 will stop in a moment and cannot move due to the "backlash" problem produced when the gear is reversing, so that the stepper motor 40 cannot drive the image capturing unit 10 effectively. In short, if the image capturing unit 10 scans the object A from left to right along the scanning direction X, a turning point is produced at the scanning position XC and the "backlash" problem happens, and if the image capturing unit 10 scans the object A from right to left along the scanning direction X, a turning point is produced at the scanning position XB and the "backlash" problem happens.

Thus, the most important goal for now is to provide an image scanning system that can move the image capturing unit and have no "backlash" problem.

SUMMARY OF THE INVENTION

The present invention is directed to provide an image scanning system that uses an image capturing unit moving along an optical axis direction unidirectionally, such that an object is positioned within a range of the depth of field of the image capturing unit. The optical axis direction is perpendicular to a plane, and a platform bearing the object and the plane form an included angle, such that multiple inclined surfaces of the object face the same end of a scanning direction, or such that one of the multiple inclined surfaces is parallel to the plane and other inclined surfaces still face the same end of the scanning direction, wherein the scanning direction is parallel to the plane.

An image scanning system of one embodiment of the present invention includes an image capturing unit, a first stepper motor, a platform and a second stepper motor. The image capturing unit includes a charge coupled device, a complementary metal oxide semiconductor, or a contact image sensor. The image capturing unit captures an image of an object along an optical axis direction of the image capturing unit, wherein the optical axis direction is perpendicular to a plane, and the object has a first inclined surface and a second inclined surface. The first stepper motor is connected to the image capturing unit, and the first stepper motor drives the image capturing unit and the object to move with respect to each other along a scanning direction between a first end and a second end of the scanning direction, so as to scan the object, wherein the scanning direction is parallel to the plane, and when the object is parallel to the plane, the first inclined surface faces the first end and the second inclined surface faces the second end. The platform bears the object, wherein the platform and the plane form a first included angle, such that the first inclined surface and the second inclined surface of the object face the first end or the second end, or such that one of the first inclined surface and the second inclined surface is parallel to the plane. The second stepper motor is connected to the image capturing unit, and the second stepper motor drives the image capturing unit to move unidirectionally along the optical axis direction, such that the object is positioned within a range of the depth of field of the image capturing unit.

The objective, technologies, features and advantages of the present invention will become apparent from the following description in conjunction with the accompanying drawings wherein certain embodiments of the present invention are set forth by way of illustration and example.

DESCRIPTION OF THE PREFERRED EMBODIMENT

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
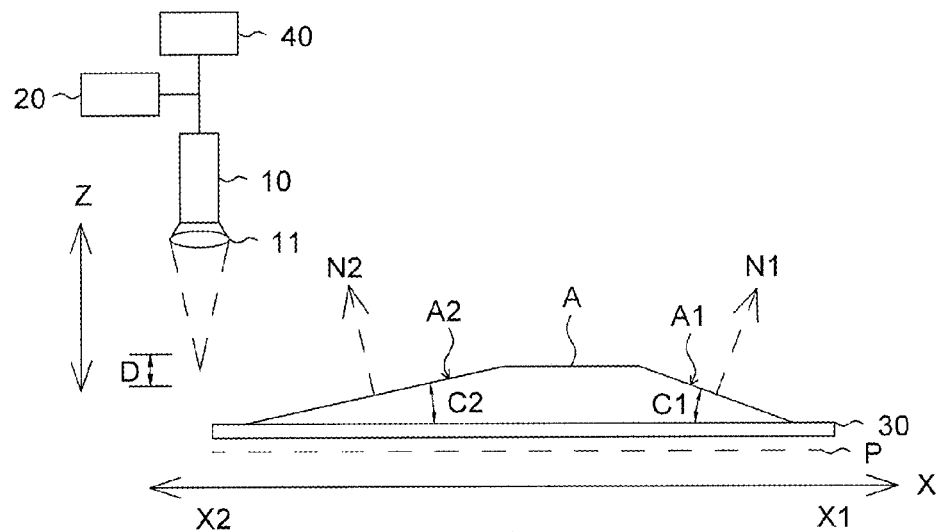
FIG. 1 is a schematic view, showing the prior-art image scanning system.
Figure 2:
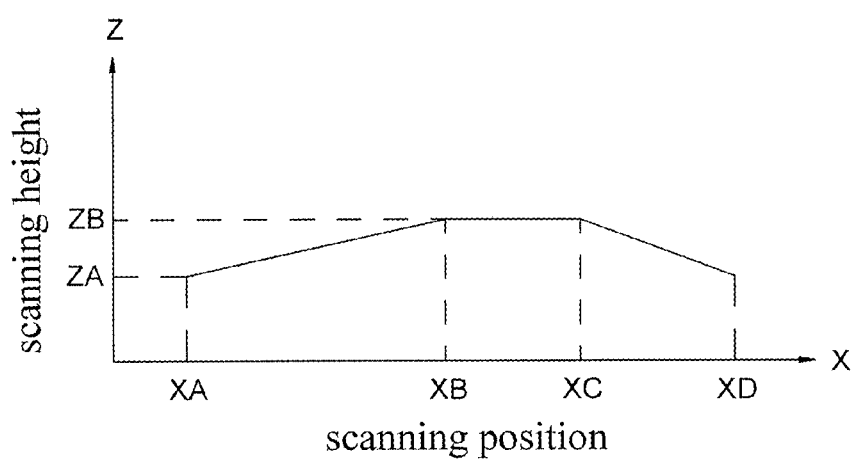
FIG. 2 is a schematic view, showing the prior-art scanning process.
Figure 3:
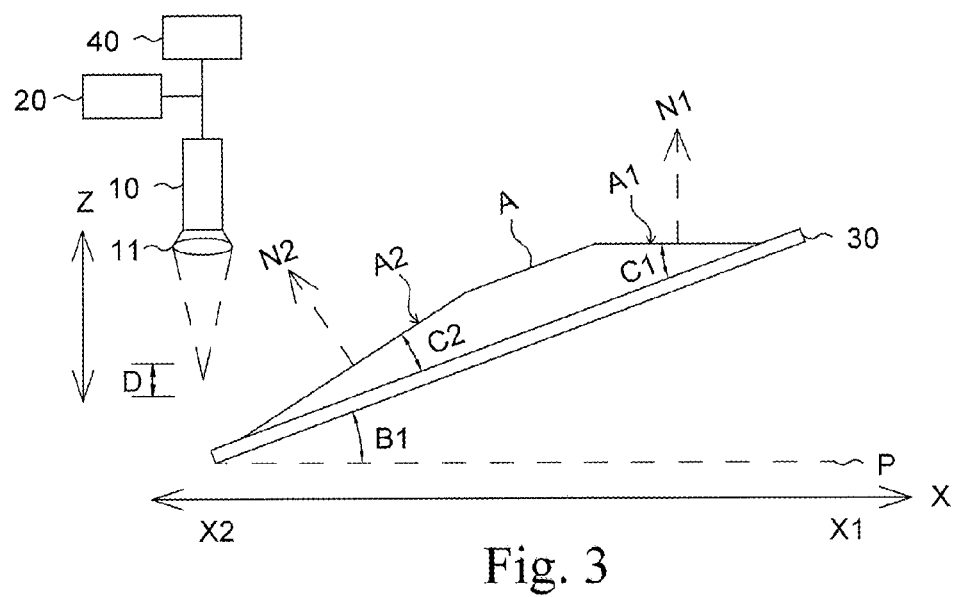
FIG. 3 is a schematic view, showing an image scanning system of one embodiment of the present invention.

Referring to FIG. 3, an image scanning system of one embodiment of the present invention includes an image capturing unit 10, a first driving unit 20, a platform 30 and a second driving unit 40. The image capturing unit 10 captures an image of an object A along an optical axis direction Z of the image capturing unit 10, wherein the optical axis direction Z is perpendicular to a plane P, and the object A has a first inclined surface A1 and a second inclined surface A2.

The first driving unit 20 is connected to the image capturing unit 10, and the first driving unit 20 drives the image capturing unit 10 and the object A to move with respect to each other along a scanning direction X between a first end X1 and a second end X2 of the scanning direction X, so as to scan the object A, wherein the scanning direction X is parallel to the plane P. In one embodiment, the first driving unit 20 comprises a stepper motor. Continued with the above descriptions, when the object A is placed horizontally on the plane P, the first inclined surface A1 faces the first end X1, and the second inclined surface A2 faces the second end X2.

In one embodiment, the image capturing unit 10 includes a Line-Scan light-sensing device or an Area-Scan light-sensing device. In one embodiment, the image capturing unit 10 includes a charge coupled device (CCD) or a complementary metal oxide semiconductor (CMOS), and the optical element 11 may include a single lens or a lens set, which may not be a limitation. In another embodiment, the image capturing unit 10 includes a contact image sensor (CIS), which only needs multiple small rod lens 11 for imaging and is closer to the object A, so that a light path of the irradiating light L is shortened significantly and the contrast of the scanned image is improved directly. In another embodiment, a light source 70 connected to the first driving unit 20 through a connecting rod component may scan the object A synchronously with the image capturing unit 10, so as to obtain an image having a higher brightness and a high contrast. Those skilled in the art may modify and change, and may not be limited to this.

Figure 4:
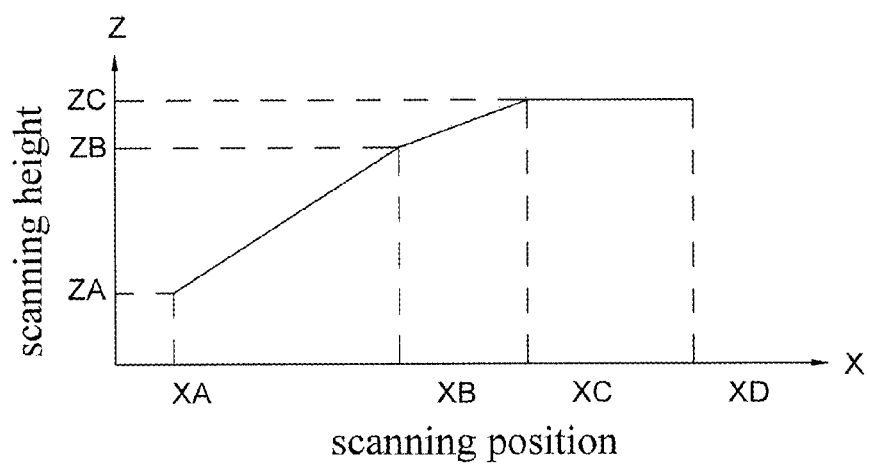
FIG. 4 is a schematic view, showing a scanning process of one embodiment of the present invention.

Referring to FIG. 3 and FIG. 4 together, in this embodiment, the platform 30 bears the object A. The platform A is obliquely disposed, facing the second end X2, and forms a first included angle B1 with the plane P, such that the first inclined surface A1 of the object A is parallel to the plane P and the second inclined surface A2 faces the second end X2, or such that both the first inclined surface A1 and the second inclined surface A2 of the object A face the second end X2, i.e., the first inclined surface A1 of the object A and the platform 30 form a second included angle C1, and the first included angle B1 is equal to or greater than the second included angle C1. In one embodiment, the platform 30 has a transparent material, and the object A and the image capturing unit 10 are disposed at opposite sides of the platform 30, so as to realize a transmission scanning system.

The second driving unit 40 is connected to the image capturing unit 10, and the second driving unit 40 drives the image capturing unit 10 to move unidirectionally along the optical axis direction Z, such that the object A is positioned within a range of the depth of field D of the image capturing unit 10 and the object A can be scanned. In one embodiment, the second driving unit 40 includes a stepper motor.

According to the structure shown in FIG. 3, in the process of one-time scan, the scanning height of the image capturing unit 10 only rises unidirectionally or descends unidirectionally and has no turning point. Even if the image scanning system uses a stepper motor 40 to drive the image capturing unit 10 through a gear drive component, the backlash problem may not happen. That is, if the image capturing unit 10 scans the object A from the second end X2 to the first end X1 along the scanning direction X, the scanning height of the image capturing unit 10 only rises unidirectionally and will not have a turning point at the scanning position XC which could lead to the backlash problem. On the other hand, if the image capturing unit 10 scans the object A from the first end X1 to the second end X2 along the scanning direction X, the scanning height of the image capturing unit 10 only descends unidirectionally and will not have a turning point at the scanning position XB which could lead to the backlash problem.

Figure 5:
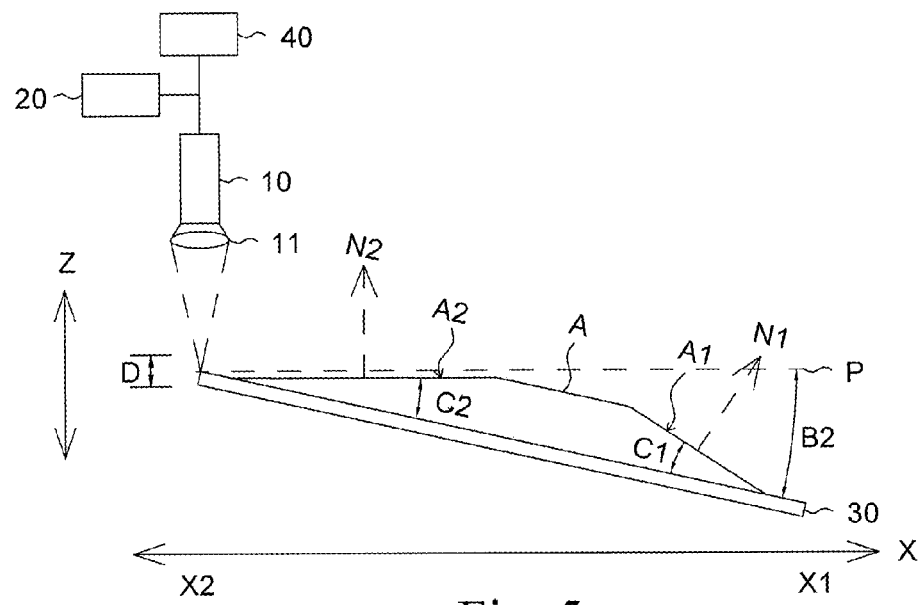
FIG. 5 is a schematic view, showing an image scanning system of another embodiment of the present invention.
Figure 6:
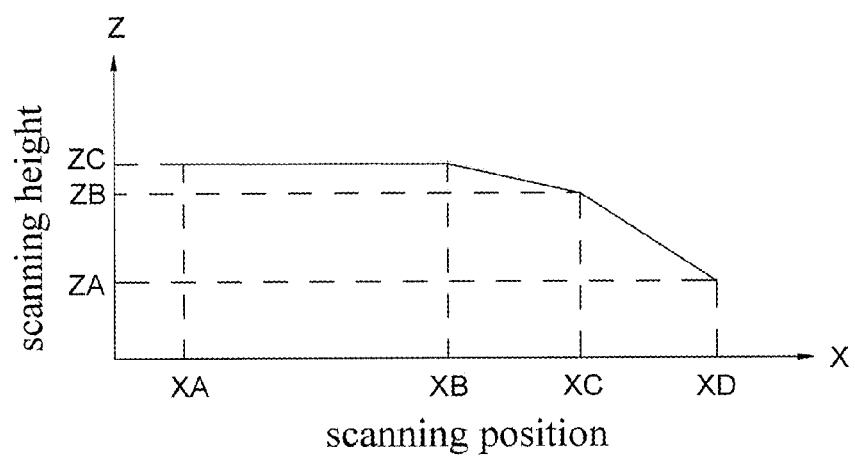
FIG. 6 is a schematic view, showing a scanning process of another embodiment of the present invention.

In the same way, referring to FIG. 5 and FIG. 6, in another embodiment, the platform 30 bears the object A. The platform A is obliquely disposed, facing the first end X1, and forms a first included angle B2 with the plane P, such that the second inclined surface A2 of the object A is parallel to the plane P and the first inclined surface A1 faces the first end X1, or such that both the first inclined surface A1 and the second inclined surface A2 of the object A face the first end X1, i.e., the second inclined surface A2 of the object A and the platform 30 form a second included angle C2, and the first included angle B2 is equal to or greater than the second included angle C2.

According to the structure shown in FIG. 5, in the process of one-time scan, the image capturing unit 10 will not meet a turning point as described above. That is, if the image capturing unit 10 scans the object A from the second end X2 to the first end X1 along the scanning direction X, the scanning height of the image capturing unit 10 only descends unidirectionally and will not have a turning point at the scanning position XC which could lead to the backlash problem. On the other hand, if the image capturing unit 10 scans the object A from the first end X1 to the second end X2 along the scanning direction X, the scanning height of the image capturing unit 10 only rises unidirectionally and will not have a turning point at the scanning position XB which could lead to the backlash problem.

Figure 7:
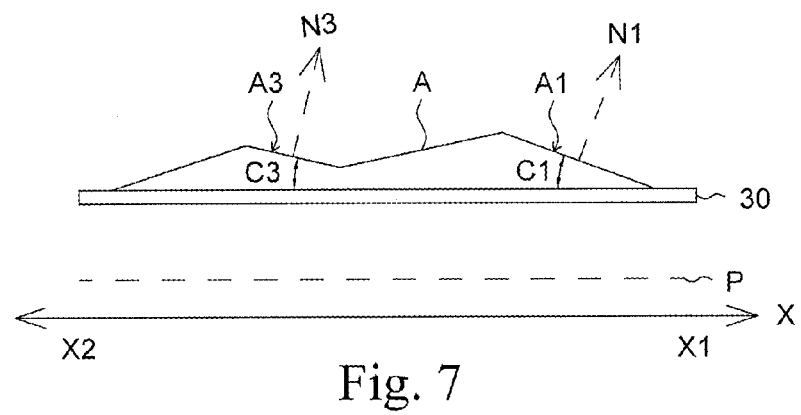
FIG. 7 is a schematic view, showing an image scanning system of yet one embodiment of the present invention.
Figure 8:
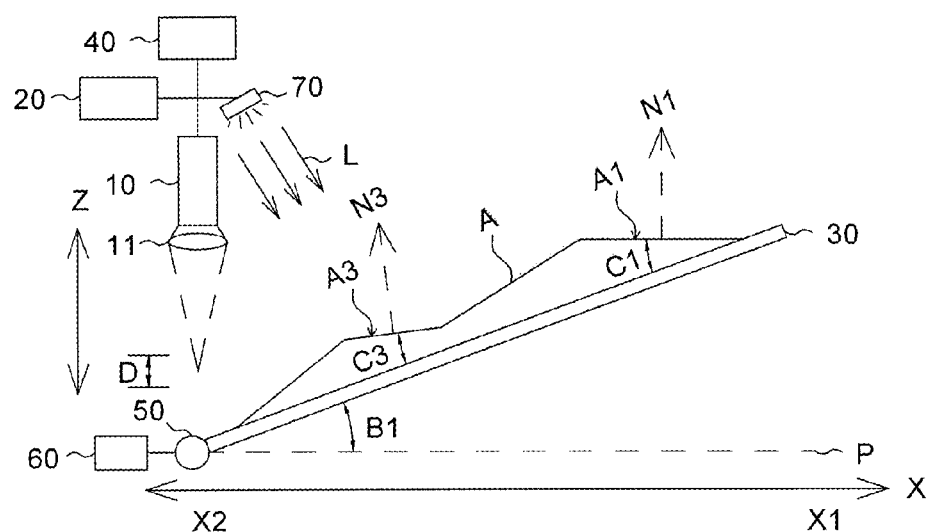
FIG. 8 is a schematic view, showing a scanning process of yet one embodiment of the present invention.

Referring to FIG. 7, the object A includes multiple first inclined surfaces A1, A3. When the platform 30 is placed on the plane P horizontally, the first inclined surface A1 faces the first end X1 of the scanning direction, and the first inclined surface A3 also faces the first end X1 of the scanning direction, i.e., the normal directions N1, N3 of the multiple first inclined surfaces A1, A3 are both inclined toward the first end X1 of the scanning direction X. Moreover, an included angle between the first inclined surface A1 and the platform 30 is C1, and an included angle between the first inclined surface A3 and the platform 30 is C3. Referring to FIG. 8, in one embodiment, the platform A is obliquely disposed, facing the second end X2, and forms a first included angle B1 with the plane P, such that the first inclined surface A1 of the object A is parallel to the plane P and another first inclined surface A3 faces the second end X2, or such that both the inclined surfaces of the object A face the second end X2. That is, the first inclined surfaces A1, A3 of the object A and the platform 30 form multiple second included angles C1, C3, and the first included angle B1 is equal to or greater than the maximum one (the second included angle C1) of the multiple second included angles C1, C3. Likewise, if the platform A is obliquely disposed, facing the first end X1, and forms a first included angle B1 with the plane P, and the object A includes multiple second inclined surfaces, then the choice of the first included angles and the second included angles may be made as described above, which will not be described again here.

Figure 9:
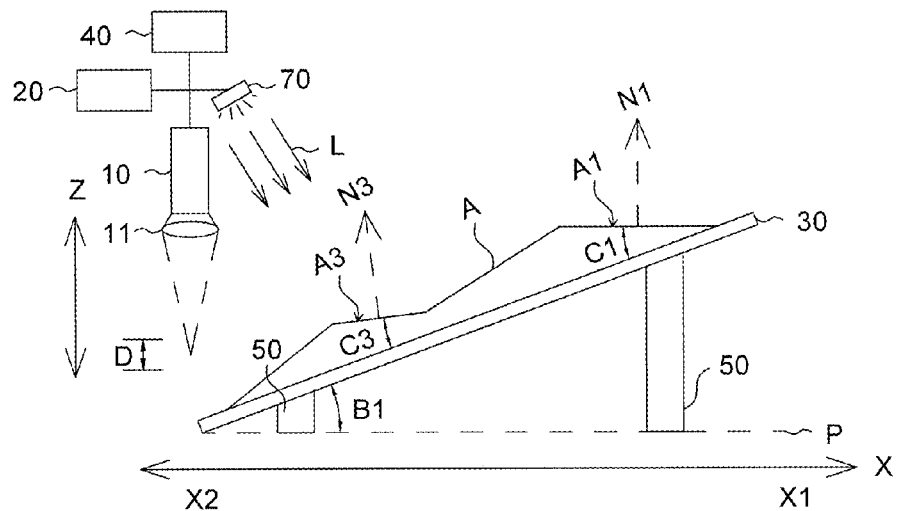
FIG. 9 is a schematic view, showing an image scanning system of yet still one embodiment of the present invention.
Figure 10:
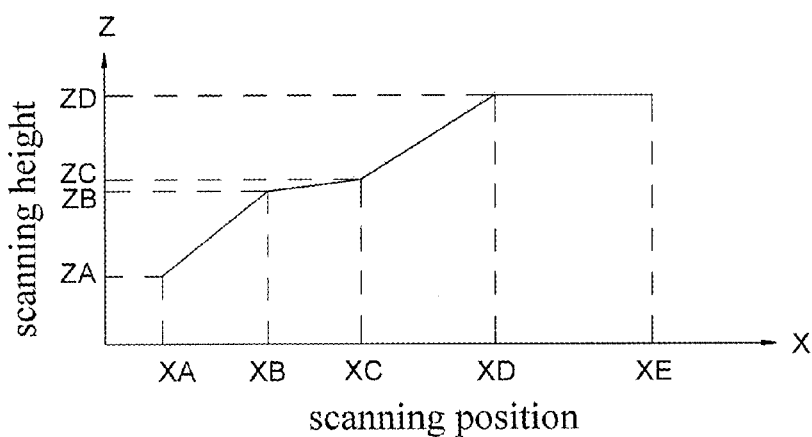
FIG. 10 is a schematic view, showing a scanning process of yet still one embodiment of the present invention.

Referring to FIG. 9 and FIG. 10 together, even if the object A includes multiple first inclined surfaces or multiple second inclined surfaces, according to the structure shown in FIG. 9, in the process of one-time scan, the image capturing unit 10 will not meet a turning point as described above. That is, if the image capturing unit 10 scans the object A from the second end X2 to the first end X1 along the scanning direction X, the scanning height of the image capturing unit 10 only rises unidirectionally from ZA to ZD and will not have a turning point at the scanning positions XB, XC, XD which could lead to the backlash problem. On the other hand, if the image capturing unit 10 scans the object A from the first end X1 to the second end X2 along the scanning direction X, the scanning height of the image capturing unit 10 only descends unidirectionally from ZD to ZA and will not have a turning point at the scanning positions XD, XC, XB which could lead to the backlash problem.

Continued to refer to FIG. 8, in one embodiment, the platform 30 includes a tilting mechanism 50 to manually adjust a magnitude of the first included angle B1, such that the first inclined surface A1 of the object A is parallel to the plane P and other inclined surfaces all face the second end X2, or such that all the inclined surfaces of the object A face the second end X2. It can be understood that the tilting mechanism 50 may be disposed at the central position of the platform 30 or other position, and the disposition at the edge position of the platform 30 is not a limitation. In another embodiment, the platform 30 includes a tilt-adjusting unit 60 connected to the tilting mechanism 50, and the tilt-adjusting unit 60 is used to automatically adjust the magnitude of the first included angle B1, such that the first inclined surface A1 of the object A is parallel to the plane P and other inclined surfaces all face the second end X2, or such that all the inclined surfaces of the object A face the second end X2. In another embodiment, referring to FIG. 9, the tilting mechanism 50 includes multiple height-adjusting elements to adjust the height of the platform 30 at different scanning positions, so as to adjust the tilt of the platform 30. Those skilled in the art may modify and change, and may not be limited to this.

Continued to refer to FIG. 9, in one embodiment, the image scanning system includes a light source 70 to provide a light L to irradiate the object A. The image capturing unit 10 captures the light irradiating from the object A and passing through the optical element 11 to produce an image of the object A.

To sum up the foregoing descriptions, the image scanning system of the present invention uses an image capturing unit moving along an optical axis direction unidirectionally, such that an object is positioned within a range of the depth of field of the image capturing unit. The optical axis direction is perpendicular to a plane, and a platform bearing the object and the plane form an included angle, such that multiple inclined surfaces of the object face the same end of a scanning direction, or such that one of the multiple inclined surfaces is parallel to the plane and other inclined surfaces face the same end of the scanning direction, wherein the scanning direction is parallel to the plane. Therefore, in the process of one-time scan, the scanning height of the image capturing unit only rises unidirectionally or descends unidirectionally and has no turning point, and thus, no backlash problem will happen.

What is claimed is:

1. An image scanning system comprising:
   an image capturing unit comprising a charge coupled device, a complementary metal oxide semiconductor, or a contact image sensor to capture an image of an object along an optical axis direction of the image capturing unit, wherein the optical axis direction is perpendicular to a plane, and the object has a first inclined surface and a second inclined surface
   a first stepper motor connected to the image capturing unit to drive the image capturing unit and the object to move with respect to each other along a scanning direction between a first end and a second end of the scanning direction, so as to scan the object, wherein the scanning direction is parallel to the plane, and when the object is parallel to the plane, the first inclined surface faces the first end and the second inclined surface faces the second end;
   a platform to bear the object, wherein the platform and the plane form a first included angle, such that the first inclined surface and the second inclined surface of the object face the first end or the second end, or such that one of the first inclined surface and the second inclined surface is parallel to the plane; and a second stepper motor connected to the image capturing unit to drive the image capturing unit to move unidirectionally along the optical axis direction, such that the object is positioned within a range of the depth of field of the image capturing unit.

2. The image scanning system according to claim 1, wherein the platform comprises a tilting mechanism to adjust a magnitude of the first included angle.

3. The image scanning system according to claim 1, wherein the platform faces the second end, the first inclined surface of the object and the platform form a second included angle, and the first included angle is greater than or equal to the second included angle.

4. The image scanning system according to claim 3, wherein the object comprises multiple first inclined surfaces, the multiple first inclined surfaces and the platform form multiple second included angles, and the first included angle is greater than or equal to the maximum one of the multiple second included angles.

5. The image scanning system according to claim 1, wherein the platform faces the first end, the second inclined surface of the object and the platform form a second included angle, and the first included angle is greater than or equal to the second included angle.

6. The image scanning system according to claim 5, wherein the object comprises multiple second inclined surfaces, the multiple second inclined surfaces and the platform form multiple second included angles, and the first included angle is greater than or equal to the maximum one of the multiple second included angles.

7. The image scanning system according to claim 1, further comprising:

a light source to provide a light to irradiate the object.

8. The image scanning system according to claim 1, wherein the image capturing unit comprises a Line-Scan light-sensing device or an Area-Scan light-sensing device.

9. The image scanning system according to claim 1, wherein the platform has a transparent material, and the object and the image capturing unit are disposed at opposite sides of the platform.

* * * * *